United States Patent [19]

Lindsay et al.

[11] Patent Number: 5,286,803

[45] Date of Patent: * Feb. 15, 1994

[54] COUMARIN DYES AND SIDE-CHAIN COUMARIN DYE-SUBSTITUTED POLYMERS WHICH EXHIBIT NONLINEAR OPTICAL PROPERTIES

[75] Inventors: Geoffrey Lindsay; Ronald A. Henry; James M. Hoover, all of Ridgecrest, Calif.

[73] Assignee: The United States of America as represented by the Secretary of the Navy, Washington, D.C.

[*] Notice: The portion of the term of this patent subsequent to Feb. 15, 2010 has been disclaimed.

[21] Appl. No.: 621,689

[22] Filed: Nov. 26, 1990

[51] Int. Cl.⁵ .................... C08F 20/06; C08F 24/00; C08F 12/08
[52] U.S. Cl. .................... 525/329.7; 526/266; 526/317.1; 526/346
[58] Field of Search .................... 525/329.7; 526/266

[56] References Cited

U.S. PATENT DOCUMENTS

| | | | |
|---|---|---|---|
| 4,579,915 | 4/1986 | Choe | 525/435 |
| 4,755,574 | 7/1988 | Choe | 526/258 |
| 4,779,961 | 10/1988 | Demartino | 350/350 R |
| 4,795,664 | 1/1989 | Demartino | 428/1 |
| 5,030,697 | 7/1991 | Hugl et al. | 525/326.9 |

OTHER PUBLICATIONS

David J. Williams, "Organic Polymeric and Non-Polymeric Materials with Large Optical Nonlinearities", Agnew. Chemical Int. Ed. Engl. 23 690–703, (1984).
M. A. Mortazaavi, A Knoessen, & S. T. Kowel, "Second-harmonic generation and absorption studies of polymer-dye films oriented by corona-onset poling at elevated temperatures", Optical Society of America 13, 6, 733–740, (1989).
P. Kaczmarski, J. P. Van de Capelle, P. E. Lagasse, & R. Meynart, "Design of an integrated electro-optic switch in organic polymers", IEE Proceedings, vol 136 No. 3, 152-158 (1989).
G. H. Cross, A. Donaldson, R. W. Gymer, S. Mann, & N. J. Parsons, "Polymeric integrated electro-optic modulators", SPIE vol. 1177 Integrated Optics and Optoelectronics, 79-91 (1989).
T. Boyd, "Applications requirements for nonlinear-optical devices and the status of organic materials", J. Opt. Society of America, B6(4) 685–692, (1984).
K. D. Singer, M. G. Kuzyk, W. R. Holland, J. E. Sohn, S. L. Lalama, R. B. Comizzoli, H. E. Katz, M. I. Schilling, Applied Phys. Letters, 53(19) 1800–1802, (1988), Electro-Optic phase modulation and optical second-harmonic generation in corona-poled films.

Primary Examiner—Joseph L. Schofer
Assistant Examiner—Wu C. Cheng
Attorney, Agent, or Firm—Stuart H. Nissim; Melvin J. Sliwka; John L. Forrest, Jr.

[57] ABSTRACT

Coumarin dyes such as alkylaminocoumarincarboxamides which have functional hydroxyl groups or which are chemically attached to vinyl monomers such as methacrylic acid. The dyes which are chemically attached to vinyl monomers can be copolymerized, e.g. with acrylic monomers to produce a coumarin dye-containing polymer. The dyes which have functional hydroxyl groups can be reacted with an existing polymer or copolymer, e.g. a copolymer of styrene and acrylic acid to esterify the acid groups of the polymer to form a coumarin dye-containing polymer. Such coumarin dye-containing polymers are formed into films and fibers which when poled in an electric field yield a film or fiber with nonlinear optical properties.

27 Claims, No Drawings

COUMARIN DYES AND SIDE-CHAIN COUMARIN DYE-SUBSTITUTED POLYMERS WHICH EXHIBIT NONLINEAR OPTICAL PROPERTIES

BACKGROUND OF THE INVENTION

This invention relates to the production of functional and polymerizable coumarin dyes for the preparation of side-chain coumarin dye-substituted polymers which exhibit nonlinear optical (NLO) properties. More particularly, the present invention is directed to the provision of functional coumarin dyes, polymerizable coumarin dyes and side-chain coumarin dye-containing polymers useful for the fabrication of organic polymeric nonlinear optical materials.

The field of nonlinear optics is concerned with the interactions of electromagnetic fields with materials to produce new fields that are altered in phase, frequency, amplitude or other propagation characteristics from the incident field. See, for example, Y. R. Shen, "The Principles of Nonlinear Optics," John Wiley & Sons, N.Y., 1984. The best known nonlinear optical effect is second harmonic generation (SHG) or frequency doubling. Optically nonlinear materials are used in frequency doublers for lasers, optical communications and computing equipment, laser resistance devices, and in optoelectronic devices for other applications. See, for example, G. Boyd, *J. Opt. Soc. of Am. B*, 6(4) 685 (1989).

Nonlinear optical devices such as frequency doublers have been based almost exclusively on inorganic materials, e.g. lithium niobate ($LiNbO_3$) and potassium dihydrogen phosphate (KDP). Crystalline organic materials, e.g. methylnitroaniline (MNA), are also under development. The disadvantages of these materials include relatively poor laser damage resistance and difficulties in preparation and fabrication into opto-electronic devices. Additionally, single organic crystals are brittle and difficult to grow.

Organic polymeric materials with large delocalized pi-electron systems exhibit very fast NLO responses, have large optical nonlinearities, and the chemical synthesis of these materials can be altered to optimize their desirable physical characteristics while preserving their NLO properties. See, for example, D. J. Williams, Agnew. *Chem. Int. Ed. Engl.*, 23, 690 (1984). Polymeric NLO materials can have very good mechanical properties. They can be mechanically tough and easily fabricated or processed into thin film geometries that are very desirable for integration with microelectronics. See, for example, G. H. Cross, et al., "Polymeric integrated electro-optic modulators," *Proceedings of the SPIE*, 1177, 79 (1989).

Two basic approaches exist for the synthesis of optically nonlinear polymers. One approach is to prepare guest-host materials by simply dissolving polarizable moieties (chromophores or dyes) as the guest in a polymeric host. This physical or solid solution may be severely limited in concentration of the chromophore due to limited solubility of the dye molecule. The other approach is to synthesize polymers that have chromophores chemically attached as either side-chain or main-chain substituents. These dye-substituted polymers have several distinct advantages over guest-host materials including higher limiting concentrations of the chromophore, reduced mobility and enhanced orientational stability of the chromophore, and improved optical, thermal and mechanical properties. See, for example, K. D. Singer, et al., *Appl. Phys. Lett.*, 53(19), 1800 (1988).

The methods used to synthesize dye-substituted polymers each have their separate advantages and disadvantages which should be considered. The attachment or substitution of chromophores onto preformed polymers is often complicated by limited reactivity of the chromophores and/or the polymer and/or poor solubility of the chromophore in the polymer. Steric interference or blocking of reactive sites on the polymer can also occur once some dye molecules have been attached to the polymer. The result is often poor control over the extend of reaction and less effective substitution of the polymer with chromophores. The polymerization of dye-substituted monomers is sometimes inhibited by side reactions, for example, in free radical polymerization the growing chain end may terminate by reaction with the dye.

The nonlinear optical properties of crystalline coumarin dyes have been previously reported and described, e.g. in U.S. Pat. No. 3,858,124. Thus, it has been disclosed that some coumarin dye single crystals have significant NLO properties, and that one specific example (7-diethylamino-4-methylcoumarin) showed frequency doubling ability that was at least as good as lithium niobate ($LiNbO_3$). This crystalline coumarin also showed better laser damage resistance than $LiNbO_3$. These reports also documented one major problem of coumarins that is common to many other crystalline materials used in NLO applications, that of difficulty in growing single crystals of sufficient size and high quality for evaluation. Further, nonpolymeric coumarin dye NLO materials, such as 7-dimethylamino-4-methylcoumarin, are limited in their usefulness by having poor mechanical properties.

Dye-containing polymers for NLO applications have been reported. See for example U.S. Pat. Nos. 4,795,664; 4,779,961; 4,755,574 and 4,579,915. However, to applicants' knowledge, no coumarin dye-containing polymers having nonlinear optical properties have to date been produced or reported.

One object of the invention accordingly is the provision of novel side-chain coumarin dye-containing polymers having nonlinear optical properties.

Another object is to provide side-chain coumarin in dye-containing polymers which also have good thermal, mechanical and optical properties.

A still further object is the provision of functional coumarin dyes and polymerizable coumarin dyes for the synthesis of the above coumarin dye-containing polymers having nonlinear optical properties.

Yet another object is to provide coumarin dyes which have functional hydroxyl groups or which are chemically attached to vinyl monomers for use in producing coumarin dye-containing polymers having NLO characteristics.

SUMMARY OF THE INVENTION

The above objects are achieved according to the invention by the provision of coumarin dye-containing polymers, and monomeric functional coumarin dyes, and polymerizable coumarin dyes for synthesis of such polymers. The monomeric coumarin dyes include alkylaminocoumarin-carboxamides which have functional hydroxyl groups or which are chemically attached to vinyl monomers such as acrylic acid or methacrylic acid. The coumarin dye-containing polymers having nonlinear optical properties can be prepared by attaching the hydroxyl group of the coumarin dye-containing monomer to an existing polymer, or by copolymerizing the coumarin dye-containing vinyl monomer with another vinyl monomer, or by homopolymerizing the coumarin dye-containing monomer.

The chemical attachment of the coumarin chromophores to polymers, particularly in the form of vinyl polymers such as polymethacrylate, restricts the mobility of the chromophores and improves their solubility in the polymers to which they are attached. A restricted mobility of the chromophores is important in the preservation of nonlinear optical properties. Good solubility of the dye in the polymer is important to the achievement of high chromophore concentrations while maintaining good physical and optical properties. Coumarin dye-containing monomers and coumarin dyes with reactive functional groups have excellent solubility in many common polymers of high optical clarity and they have sufficient reactivity to yield high degrees of chromophore incorporation into the polymer. Coumaromethacrylate monomers are very reactive in free-radical polymerizations and copolymerize well with a variety of vinyl monomers such as alkylmethacrylates and alkystyrenes to produce the novel coumarin dye-containing NLO polymers of the invention.

The coumarin dye-containing polymers of the present invention are suitable for the fabrication of films and fibers by casting, extruding, or molding, and subsequent ordering or aligning of the attached molecular dipoles through electric field and magnetic poling techniques and Langmuir-Blodgett techniques known in the art. See, for example, M. A. Mortazavi, et al., "Second-harmonic generation and absorption studies of polymer-dye films oriented by corona-onset poling at elevated temperatures," *J.Opt.Soc.Am.* B, 6(4), 733 (1989), and G. L. Gaines, *Insoluble Monolayers at Liquid-Gas Interfaces*, Interscience: New York, 1966. The resulting films exhibit strong, reproducible and stable nonlinear optical properties.

DETAILED DESCRIPTION OF THE INVENTION AND PREFERRED EMBODIMENTS

The coumarin dye-containing polymers produced according to the invention are characterized by a recurring monomeric unit corresponding to the formula:

(1)

where P is a polymer main chain unit, and
where D is a coumarin dye;

The polymer can be a homopolymer or a copolymer comprising any of a variety of polymer main chain units, including styrenic and acrylic units. Preferably a polymer contains from about 10 to 100 mole % of the recurring dye-containing monomeric unit... The polymer of this invention can be illustrated by the general formula:

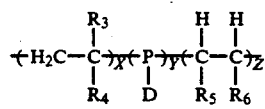

(1a)

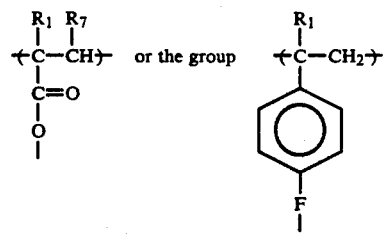

where P is the group
where F is —O—, —NH—, or —CH$_2$—O—; and,
where R$_1$ is H, an alkyl (including cyclic alkyls) of 1 to 22 carbon atoms, or other vinyl groups known in the art;
where R$_7$ is H or —COOR$_1$;
where D has the formula (1b) or (1c):

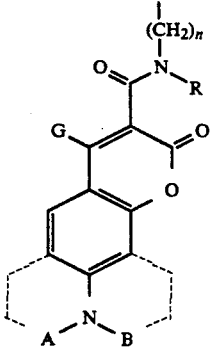

(1b)

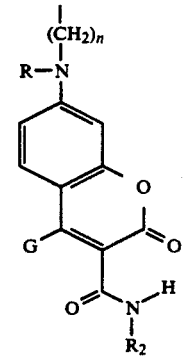

(1c)

where R and R$_2$ are H or an alkyl or alkenyl of 1 to 22 carbon atoms, e.g. methyl;
where G is H, —CH$_3$, or CF$_3$;
where A and B are H, alkyl or alkenyl of 1 to 22 carbon atoms, or the atoms necessary to complete a 6-membered heterocyclic ring containing N as the hetero atom; and,
where n=2-18;
where R$_3$, R$_4$, R$_5$, and R$_6$ are independently hydrogen,alkyl (including cyclic alkyl), alkenyl (including cyclic alkenyl), aryl, substituted aryl, cyano, amide, halogen, alkoxy, alkenoxy, or —COOR$_8$, where R$_8$ is hydrogen or an alkyl or alkenyl (including cyclic alkyl or alkenyl) of 1 to 22 carbon atoms; and,
where y is at least 3 and y/(x+y+z) is about 0.10 to 1.0.

The coumarin-containing vinyl polymers of formula (1) above can be prepared from alkylaminocoumarincarboxamide dyes which have functional hydroxyl groups, acrylic functional groups, or styrenic functional groups having the following general formula:

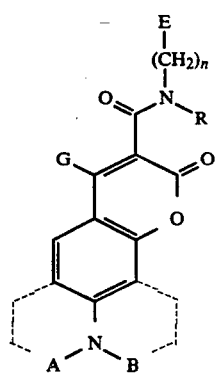
(2)

or

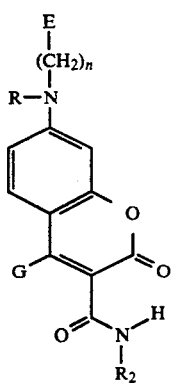

where E is —OH, the group

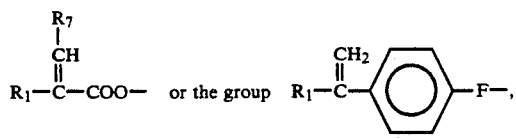

where $R_7$ is H or —COOR$_1$;

where R, $R_1$, and $R_2$ are independently H or an alkyl or alkenyl of 1 to 22 carbon atoms (e.g. methyl);

where A and B are independently H, an alkyl or alkenyl of 1 to 22 carbon atoms, or the atoms necessary to complete a 6-membered heterocyclic ring;

where n=2-18, preferably 2-6; and, where F is —O—, —NH—, or —CH$_2$—O—.

Specific examples of hydroxy-functional coumarin dyes are set forth below in formulae (2a) and (2b), and specific examples of polymerizable coumarin dyes are set forth in formulae (2c) and (2d) below.

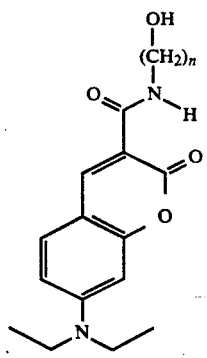
(2a)

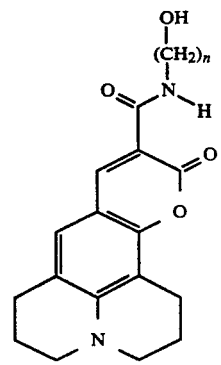
(2b)

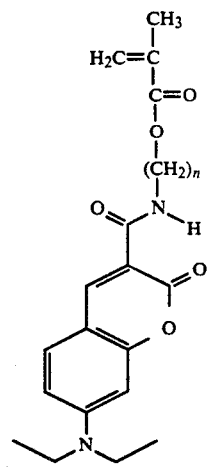
(2c)

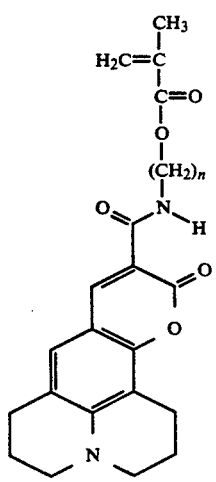
(2d)

The preparation of the hydroxy-functional coumarin dye (2a) is set forth in Example 1 below. The hydroxy-functional coumarin dyes such as (2a) and (2b) can then be esterified with methacrylic acid to produce the polymerizable coumarin dyes (2c) and (2d), by procedure set forth in Examples II and III below.

The alkylaminocoumarincarboxamide having the attached methacrylic ester grouping, compound (2c), is polymerized with methyl methacrylate, according to Examples IV and V below to produce the methacrylate copolymer (3) below.

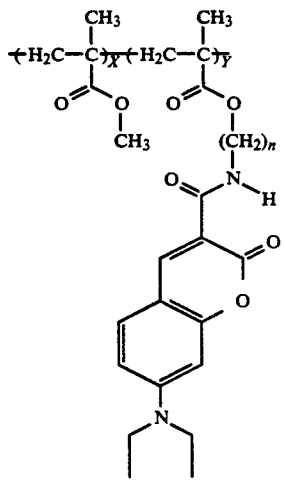

(3)

where y is at least 3, y/(x+y) is 0.10 to 1.0, and n is as previously described.

It is noted that the coumarin dye-containing polymer (3) above can also be prepared by reacting a hydroxy-functional coumarin dye (2a) with preformed polymer, e.g. a copolymer of methylmethacrylate and methacrylic acid.

Furthermore, as illustrated in Example VIII below, a hydroxy-functional coumarin dye, e.g., as illustrated in Formula (2a), can be reacted with a copolymer of styrene and acrylic acid, to esterify some of the acid groups of the polymer and attach the coumarin dye to the polymer to form the coumarin dye-containing polymer shown below in Formula (4).

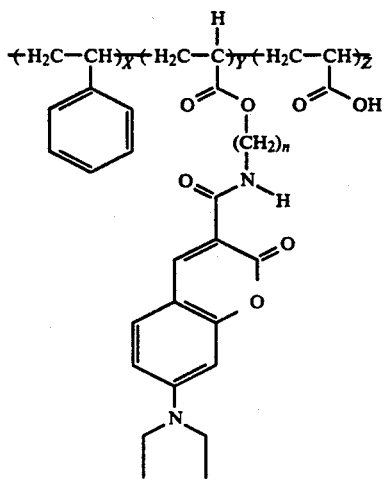

(4)

The formulae (5) and (6) below illustrate still further coumarin-containing polymers according to the invention.

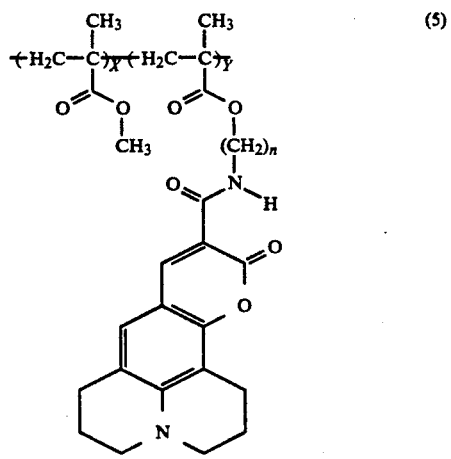

(5)

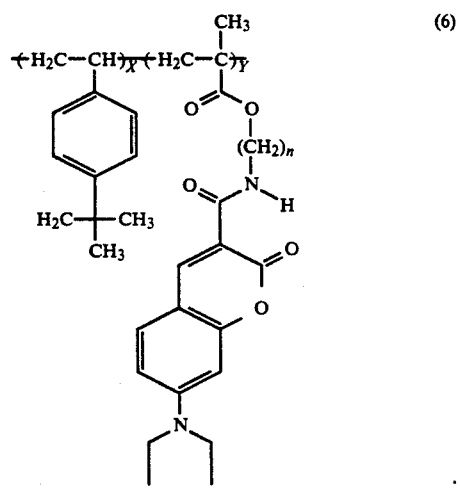

(6)

Examples VI and VII below illustrate preparation of the coumarin dye-substituted tertiarybutyl styrene-methyl methacrylate copolymer of formula (6), by copolymerizing the polymerizable coumarin dye 2(c) above, with t-butyl styrene.

In all of the compounds (2a) through (6) above, n ranges preferably from 2 to 6. It is anticipated that the polymers of the present invention may be crosslinked by appropriate strategies. Crosslinking of these polymers may be carried out by reacting residual carboxylic acid groups or residual amino groups on the polymers with diepoxides, or by, thermal or U.V. treatment of one of the polymers of the present invention in the presence of a free radical generator to crosslink the polymer by reaction of alkyl, allylic or alkenylic groups in the polymer.

The following are examples of practice of the invention.

EXAMPLE I

Functional Dye Synthesis Preparation of (2a), n=2

Hydroxy-functional and polymerizable coumarin dyes were prepared from 3-carbomethoxy-7-diethylaminocoumarin (CMDEAC) which was prepared as follows. To a charge of 4-diethylaminosalicylaldehyde (6.12 g., 0.032 mole) were added dimethylmalonate (4.17 g., 0.032 mole), 75 ml methanol, and 22 drops of piperidine. The solution was stored at room temperature for 4 weeks and then the solvent was removed on a rotary evaporator at room temperature. The remaining, fluorescent, viscous oil was chromatographed on 170 g. of silica using chloroform. The first fractions to elute were starting reactants. These were followed by 5.4 g. (61% yield) of CMDEAC which was recovered as a viscous oil. It was used without further purification.

The hydroxy-functional coumarin dye N-(2-hydroxyethyl)-7-diethylaminocoumarin-3-carboxamide was prepared as follows. A charge of CMDEAC (6.12 g.) and ethanolamine (1.29 g.) was refluxed in 20 ml of benzene for 24 hours with stirring. The cooled solution was seeded and allowed to stand. Somewhat gummy crystals formed slowly.

The crystals were washed once with cold benzene and recrystallized from 60 ml of benzene with carbon decolorization. A yield of 1.78 g. with a melting point of 126°–127° C. was obtained. A second recrystallization from benzene yielded flat yellow needles with a melting point of 127°–128° C. Elemental analysis indicated 63.88% C, 6.67% H, and 8.87% N (theoretical: 63.14% C, 6.62% H, and 9.21% N).

EXAMPLE II

Polymerizable Dye Synthesis Preparation of (2c), n=2

A polymerizable, methacrylate ester of N-(2-hydroxyethyl)-7-diethylaminocoumarin-3-carboxamide was prepared as follows. To a charge of N-(2-hydroxyethyl)-7-diethylaminocoumarin-3-carboxamide (1.087 g.) were added 4-diethylaminopyridine (0.054 g.), 4-methoxyphenol (0.012 g.), and methylene dichloride (20 ml). To this solution were added methacrylic acid (0.4644 g.) in 5 ml methylene dichloride, followed by dicyclohexylcarbodiimide (1.045 g.) in a few ml of methylene dichloride. Within a few minutes dicyclohexylurea began to precipitate from solution. After standing overnight at room temperature, the urea was filtered off and washed with small volumes of methylene dichloride. The solvent was removed from the filtrate on a rotary evaporator. The dark yellow resin obtained was dissolved in 15 ml of benzene, treated with 15 ml of cyclohexane, and allowed to stand for 16 hours. The solution was then clarified by stirring with Celite and filtered. The Celite cake was washed with 6 ml of 1:1 benzene/cyclohexane. The filtrate was chilled to 5° C. and additional resin precipitated. The supernatant was decanted, the resin was triturated with 4 ml of cold mixed solvent, and the combined solutions were diluted with 10 ml of n-hexane. The turbid solution slowly deposited yellow crystals during several days at room temperature. After chilling for several more days at 5° C., the supernatant was decanted from the crystalline solid which was then washed twice with cold 1:1:1 benzene/cyclohexane/n-hexane and dried under reduced pressure at room temperature. The product was a coarse yellow crystalline solid which melted 143°–144° C. Proton NMR and elemental analysis were consistent with the desired product.

EXAMPLE III

Polymerizable Dye Synthesis Preparation of (2d), n=3

A polymerizable methacrylate ester of 1, 2, 4, 5, 3H, 6H, 10H-tetrahydro-9-[N-(3-hydroxypropyl)] carboxamido [1]benzopyrano-(9, 9a, 1-gh)quinolizin-10-one (Formula 2d) was prepared as follows. Coumarin 314 (Eastman Kodak, 0.317 g.), 3-amino-1-propanol (0.118 g.), and 10 ml of dry benzene were added to a flask, stirred, and refluxed for 16 hours. An additional 10 ml of dry benzene was added to dissolve any crystallized material and the reflux was continued for an additional 8 hours. The solution was cooled to 5° C. and the yellow solid was filtered, washed with cyclohexane, and dried. A yield of 0.246 g. of the intermediate was recovered, and showed a melting point of 180°–181° C. This hydroxy-functional coumarin dye (2b) was then converted to the methacrylate ester (2d) using methacrylic acid, dicyclohexylcarbodiimide, 4-methoxyphenol, and 4-dimethylaminopyridine, in dichloromethane as described above in Example II.

EXAMPLE IV

Polymer Synthesis Preparation of (3), n=2

A coumaromethacrylate (CMA) monomer N-(2-methacryloxyethyl)-7-diethylaminocoumarin-3-carboxamide (formula 2c) (1.0240 g, 0.00275 mol) was added to a 100 ml round bottom flask along with methyl methacrylate (1.0420 g, 0.01041 mol), azobisisobutyronitrile (0.0217 g), chlorobenzene (20 g), and benzene (6.55 g). The reagents were stirred magnetically with a stirring bar and dissolved completely in several minutes. The flask was connected to a reflux condenser, purged with nitrogen gas, and heated to a mild reflux for 16 hours under a dry nitrogen atmosphere. The solution was cooled to room temperature and slowly poured into 600 ml of rapidly stirring hexane. A yellow fluffy precipitate formed immediately and was isolated by suction filtration of the hexane mixture. A yellow solid was obtained and dried by heating to 100° C. under reduced pressure.

The product was purified by preparative gel permeation chromatography (GPC) in chloroform with styragel columns which removed all unattached coumarin dye. The final product was isolated by evaporating the chloroform and drying the sample for an hour at 100° C. under reduced pressure. A product yield of 0.8541 g (41%) was obtained. The sample was characterized by analytical GPC, proton nuclear magnetic resonance (NMR) spectroscopy, differential scanning calorimetry (DSC), and ultraviolet/visible (UV/Vis) spectroscopy. The GPC analysis indicated that the sample was high molecular weight (Number average Molecular weight ($\overline{M}_n$=84,000 g/mole, polydispersity=3.3). The NMR analysis indicated that sample had a CMA repeat unit mol fraction of 0.20. The DSC analysis indicated that the sample had a glass transition temperature ($T_g$) of 110° C., and the UV/Vis analysis indicated that the sample had an absorbance maximum (in chloroform solution) of 419 nm with a full-width, half-maximum of 44 nm.

EXAMPLE V

Polymer Synthesis Preparation of (3), n=2

A CMA monomer N-(2-methacryloxyethyl)-7-diethylaminocoumarin-3-carboxamide (formula 2c), 2(A)-n-2 (0.2610 g, 0.000701 mol) was added to a 50 ml round bottom flask along with methylmethacrylate (1.3310 g, 0.0133 mol), azobisisobutyronitrile (0.0157 g), and benzene (15.39 g). The flask was connected to a reflux condenser, purged with nitrogen gas, and heated to a mild reflux for 23 hours under a dry nitrogen atmosphere. The solution was cooled to room temperature and the solvent was evaporated. A yellow solid was obtained and dried by heating to 100° C. under reduced pressure for one hour. The product was purified by preparative GPC in chloroform with styragel columns which removed all unattached coumarin dye. The final product was isolated by evaporating the chloroform and drying the sample for an hour at 100° C. under reduced pressure. A product yield of 0.637 g (40%) was obtained. The sample was characterized by analytical GPC, proton NMR spectroscopy, DSC, and UV/Vis spectroscopy. The GPC analysis indicated that the sample was high molecular weight ($\overline{M}_n$=38,000 g/mole, polydispersity=1.6). The NMR analysis indicated that sample had a CMA repeat unit mol fraction of 0.034. The DSC analysis indicated that the sample had a $T_g$ of 109° C., and the UV/Vis analysis indicated that the sample had an absorbance maximum (in chloroform solution) of 419 nm with a full-width, half maximum of 44 nm.

EXAMPLE VI

Polymer Synthesis Preparation of (6), n=2

A CMA monomer N-(2-methacryloxyethyl)-7-diethyl aminocoumarin-3-carboxamide, (formula 2c), (0.3639 g, 0.000977 mol) was added to a 50 ml round bottom flask along with t-butylstyrene (0.5494 g, 0.00343 mol), azobisisobutyronitrile (0.0095 g), and benzene (25 g). The reagents were stirred magnetically with a stirring bar and dissolved completely in several minutes. The flask was connected to a reflux condenser, purged with nitrogen gas, and heated to a mild reflux for 10 hours under a dry nitrogen atmosphere. The solution was cooled to room temperature and the solvent was evaporated. A yellow solid was obtained and dried by heating to 100° C. under reduced pressure.

The product was purified by preparative GPC in chloroform with styragel columns which removed all unattached coumarin dye. The final product was isolated by evaporating the chloroform and drying the sample for an hour at 100° C. under reduced pressure. A product yield of 0.380 g (42%) was obtained. The sample was characterized by analytical GPC, NMR spectroscopy, DSC, and UV/Vis spectroscopy. The GPC analysis indicated that the sample was high molecular weight ($\overline{M}_n$=29,000 g/mole, polydispersity=1.8). The NMR analysis indicated that sample had a CMA repeat unit mol fraction of 0.26. The DSC analysis indicated that the sample had a $T_g$ of 132° C., and the UV/Vis analysis indicated that the sample had an absorbance maximum (in chloroform solution) of 418 nm with a full width, half-maximum of 45 nm.

EXAMPLE VII

Polymer Synthesis Preparation of (6), n=5

A CMA monomer N-(5-methacryloxypentyl)-7-diethyl aminocoumarin-3-carboxamide (formula 2c) (0.3760 g, 0.00101 mol) was added to a 50 ml round bottom flask along with t-butylstyrene (0.5551 g, 0.00346 mol), azobisisobutyronitrile (0.0095 g), and benzene (20 g). The reagents were stirred magnetically with a stirring bar and dissolved completely in several minutes. The flask was connected to a reflux condenser, purged with nitrogen gas, and heated to a mild reflux for 12 hours under a dry nitrogen atmosphere. The solution was cooled to room temperature and the solvent was evaporated. A yellow solid was obtained and dried by heating to 100° C. under reduced pressure.

The product was purified by preparative GPC in chloroform with styragel columns which removed all unattached coumarin dye. The final product was isolated by evaporating the chloroform and drying the sample for an hour at 100° C. under reduced pressure. A product yield of 0.271 g (29%) was obtained. The sample was characterized by analytical GPC, NMR spectroscopy, DSC, and UV/Vis spectroscopy. The GPC analysis indicated that the sample was high molecular weight ($\overline{M}_n$=24,000 g/mole, polydispersity=1.7). The NMR analysis indicated that the sample had a CMA repeat unit mol fraction of 0.21. The DSC analysis indicated that the sample had a $T_g$ of 100° C., and the UV/Vis analysis indicated that the sample had an absorbance maximum (in chloroform solution) of 418 nm with a full-width, half-maximum of 45 nm.

EXAMPLE VIII

Polymer Synthesis—Preparation of (4), n=2

An hydroxy-functional coumarin dye N-(2-hydroxyethyl)-7-diethyl-aminocoumarin-3-carboxamide (formula 2a) (1.2158 g, 0.00399 mol) was added to a 50 ml round bottom flask along with a copolymer of styrene and acrylic acid (1.0164 g, 0.00328 mol of acid), dicyclohexylcarbodiimide (0.6924 g, 0.00336 mol), 4-dimethylaminopyridine (0.0519 g, 0.000425 mol), and tetrahydrofuran (21.03 g). The reagents were stirred magnetically with a stirring bar and dissolved completely in ca. 10 minutes. The flask was connected to a reflux condenser, purged with nitrogen gas, heated to a mild reflux, and stirred for 2 hours under a dry nitrogen atmosphere. The solution was then cooled to room temperature and poured slowly into 600 ml of rapidly stirring cyclohexane. A yellow fluffy precipitate formed immediately and was isolated by suction filtration of the cyclohexane mixture. A yellow solid was obtained and dried by heating to 80° C. under reduced pressure.

The product was purified by preparative GPC in chloroform with styragel columns which removed all unattached coumarin dye. The final product was isolated by evaporating the chloroform and drying the sample for an hour at 80° C. under reduced pressure. A product yield of 0.952 g was obtained. The sample was characterized by analytical GPC, NMR spectroscopy, DSC, and UV/Vis spectroscopy. The GPC analysis indicated that the sample was high molecular weight ($\overline{M}_n$=31,000 g/mole, polydispersity=1.8). The NMR analysis indicated that the sample had a coumarin dye-substituted repeat unit mol fraction of 0.10. The DSC analysis indicated that the sample had a $T_g$ of 93° C., and the UV/Vis analysis indicated that the sample had an absorbance maximum (in chloroform solution) of 421 nm with a full-width, half-maximum of 45 nm.

EXAMPLE IX

Polymer Synthesis

In a procedure essentially the same as the procedure described in Example VIII above, an hydroxy-functional coumarin dye is added to a preformed copolymer of styrene and maleic anhydride to form a coumarin dye-containing polymer.

EXAMPLE X

Film Formation

An optically nonlinear polymer film was prepared from the material described above in Example IV as follows. The coumarin dye-containing polymer (150 mg.) was dissolved in chlorobenzene (2 ml). A glass microscope slide (BK7) was thoroughly cleaned with several water washings followed by rinses with acetone and methanol. The slide was placed on the chuck of a photo-resist spinner and the spinning speed was set at ca. 800 rpm. Several drops of the polymer solution were placed in the center of the slide and the slide was then spun for 30 seconds at room temperature. The spinner was stopped and the slide was removed and placed in an air-circulating oven at 140° C. for 2 hours and in a vacuum oven at 140° C. for 24 hours to remove the solvent. The thickness of the cast film measured with a profilometer and determined to be ca. 836 nm. The UV/Vis spectrum of the film was recorded ($\lambda_{max}$=425 nm, $A_{max}$=1.46) with a spectrometer and the sample was prepared for electric field poling.

The glass-supported film was placed on the grounded aluminum heated stage of a corona-poling apparatus and heated to 155° C. A thin tungsten wire electrode was suspended 1 cm above the film and an electric field (ca. 5500 VDC, ca. 1.7 uA) was applied between the wire electrode and the grounded electrode. The film was held at 155° C. for 5 min. and then cooled to room temperature while in the presence of the electric field. The UV/Vis spectrum of the film was measured again ($\lambda_{max}$=425 nm, $A_{max}$=1.09) and a chromophore orientation factor of 0.25 was calculated. Second harmonic generation (SHG) was utilized as a measure of the NLO properties of the sample. The SHG measurement was performed using a fundamental wavelength of 1064 nm and the amount of light produced at 532 nm was measured and compared to that from a quartz standard. The amount of second harmonic produced was used to calculate a $d_{33}$ of ca. 19 pm/V. A second order nonlinear susceptibility $\beta$ was calculated for the film (using MOPAC ver.5, by: J. J. P. Stewart, Frank J. Seiler Research Laboratory, U.S. Air Force Academy, Colorado Springs, Colo.) to be about $20.5 \times 10^{-30}$ esu.

It will be understood that various vinyl monomers can be employed for polymerization with the coumarin dye monomers, such as (2c), to form the coumarin-containing polymers of the present invention, and various vinyl-containing monomers can be copolymerized with acrylic acid or methacrylic acid to form vinyl copolymers, e.g. acrylic acid and styrene copolymers, for reaction with hydroxy-functional coumarin dyes such as (2a) and (2b). Additional examples of such vinyl monomers are isopropyl fumarate, acrylonitrile, acrylamide, vinyl napthaline, acenapthalene, vinyl chloride, vinylidene fluoride, maleic anhydride, phenyl vinyl ether, vinyl benzoate, maleimide, butadiene, cyclohexyl methacrylate, adamantonol methacrylate, and borneol methacrylate.

The coumarin dye-substituted polymers of the present invention have excellent processing characteristics which include solubility in common organic solvents, adhesion to substrates, mechanical toughness, thermal stability, and a high laser damage threshold. These characteristics translate into an ability to form rugged, high quality, uniform films which may be oriented by electric field poling techniques and crosslinked during the poling process.

When an NLO polymer is synthesized by attaching a coumarin dye to a polymer, the resulting material has many physical properties that can be quite similar to those of the same polymer having no dye attached. These similarities include retention of $T_g$, mechanical toughness, and other general physical and thermal properties. This permits the design of many useful coumarin dye-containing NLO materials. Although all of the polymers prepared in the examples were amorphous, it is possible that some of the polymers of the invention may form liquid crystalline phases depending also upon the comonomer used and the spacer length, n, in the coumarin monomer.

Another very advantageous feature of coumarin dye-containing polymers is their broad window of transparency to visible light. This permits the use of these polymers in films for use in devices for eye and sensor protection. At high intensities, a portion of visible light may undergo frequency doubling into the ultraviolet spectrum. Films of these polymers may also be used as electro-optic switches and modulators. See, for example, P. Kaczmarski, et al., "Design of an integrated electro-optic switch in organic polymers," *IEE Proceedings*, 136, Pt. J. (3), 152 (1989).

The relaxation of the alignment of (guest-host) dissolved chromophores in poled films results in a loss of NLO properties. See, for example, K. D. Singer, et al., *Appl. Phys. Lett.*, 53(19), 1800 (1988). An additional advantage of coumarin dye-containing polymers of this invention is their high orientational stability which in turn provides high NLO property stability. Coumarin dye-containing polymers have a significant ability to resist chromophore realignment as evidenced by the results of accelerated aging experiments and the crosslinking of these polymers will increase their stability to an even greater extent.

Another advantageous feature of attaching coumarin dyes to polymers for NLO applications is the high chromophore concentrations that may be obtained. Simple solutions of dyes in polymers are often restricted to very low concentrations of the dye (1 to 5%) due to immiscibility. By attaching the chromophore to the polymer through a polymerizable dye or a post-polymerization reaction, a single phase, homogeneous material with a much higher chromophore concentration is achievable.

The excellent thermal, mechanical, optical and NLO properties of the unique coumarin dye-containing polymers of the present invention are substantially different from both crystalline coumarin compounds and the other dye-containing polymers of the prior art.

From the foregoing, it is seen that the invention provides for the preparation of a novel class of monomeric coumarin dyes and a novel class of coumarin dye-containing polymers having excellent nonlinear optical properties, as well as other important advantages.

Since various changes and modifications can be made in the invention without departing from the spirit of the invention, the invention is not to be taken as limited except by the scope of the appended claims.

What is claimed is:

1. Coumarin dye-containing polymers which are water insoluble, having second-order nonlinear optical properties, which are characterized by a recurring monomeric unit corresponding to the formula:

where P is a polymer main chain unit; and,
where D is a coumarin dye selected from the group consisting of:

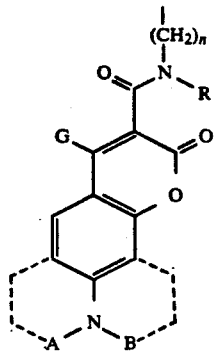

and

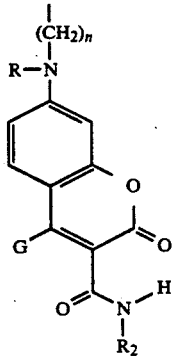

where R and R₂ are independently selected from the group consisting of H, alkyl of 1 to 22 carbon atoms, and alkenyl of 1 to 22 carbon atoms;

where G is selected from the group consisting of H, —CH$_3$, and —CF$_3$;

where A and B are independently selected from the group consisting of H, alkyl of 1 to 22 carbon atoms, and the atoms necessary to complete a 6-membered ring; and, where n=2 to 18.

2. Coumarin dye-containing polymers as defined in claim 1, where P is selected from the group consisting of a styrenic unit and an acrylic funit.

3. Coumarin dye-containing polymers as defined in claim 1, where P is an acrylic unit.

4. Coumarin dye-containing polymers as defined in claim 1, where P is a styrenic unit.

5. Coumarin dye-containing polymers as defined in claim 1, where P is selected from the group consisting of:

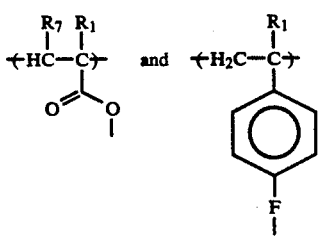

where R$_1$ is selected from the group consisting of H or alkyl of 1 to 22 carbon atoms;

where R$_7$ is selected from the group consisting of H and —COOR$_1$; and, where F is —O—, —NH—, or —CH$_2$—O—.

6. Coumarin dye-containing polymers as defined in claim 1, where D is selected from the group consisting of:

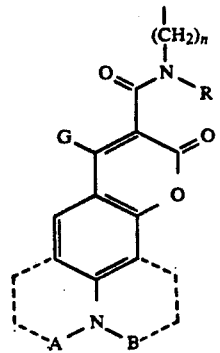

and

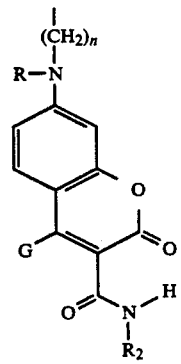

where R and R$_2$ are independently selected from the group consisting of H, alkyl of 1 to 22 carbon atoms, and alkenyl of 1 to 22 carbon atoms;

where G is selected from the group consisting of H, —CH$_3$, and —CF$_3$;

where A and B are independently selected from the group consisting of H, alkyl of 1 to 22 carbon atoms, alkenyl of 1 to 22 carbon atoms, and the atoms necesary to complete a 6-membered ring; and, where n=2 to 18.

7. Coumarin dye-containing polymers as defined in claim 1, further comprising non-coumarin containing main chain units, which can be illustrated by the formula:

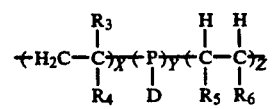

where R$_3$, R$_4$, R$_5$, and R$_6$ are independently selected from the group consisting of alkyl, alkenyl, aryl, substituted aryl, cyano, amide, halogen, alkoxy, or —COOR$_8$, where R$_8$ is selected from the group consisting of H, alkyl of 1 to 22 carbon atoms, and alkenyl of 1 to 22 carbon atoms; and, where y is at least 3, (x+y+z) ranges from 3 to about 3000, and y/(x+y+z) is 0.10 to 1.0.

8. Coumarin dye-containing polymers as defined in claim 7, where P is selected from the group consisting of a styrenic functional unit and an acrylate functional unit.

9. Coumarin dye-containing polymers as defined in claim 7, where n=2 to 6.

10. Coumarin dye-containing polymers as defined in claim 7, where D is selected from the group consisting of:

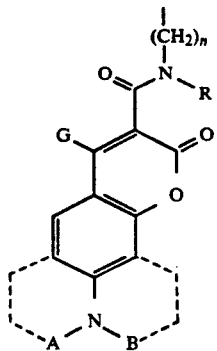

and

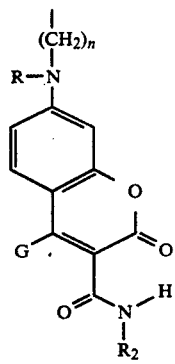

where R and $R_2$ are independently selected from the group consisting of H, alkyl of 1 to 22 carbon atoms, and alkenyl of 1 to 22 carbon atoms:
where A and B are independently selected from the group consisting of H, alkyl of 1 to 22 carbon atoms, alkenyl of 1 to 22 carbon atoms, and the atoms necessary to complete a 6-membered ring;
where G is selected from the group consisting of H, —CH₃, and —CF₃; and, where n=2 to 18.

11. Coumarin dye-containing polymers as defined in claim 10 wherein R is H; $R_1$ and $R_3$ are methyl; $R_4$ is —COOCH₃; and, z=0.

12. Coumarin dye-containing polymers as defined in claim 10, where R is H, $R_1$ and $R_3$ are CH₃, $R_4$ is aryl, and z=0.

13. Coumarin dye-containing polymers as defined in claim 12, where n=2.

14. Coumarin dye-containing polymers as defined in claim 10, where $R_3$ is H, $R_4$ is t-butyl phenyl, D is

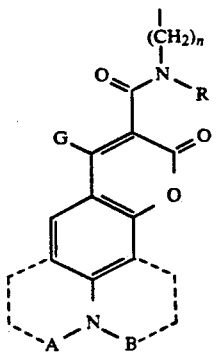

where both A and B are ethyl; G is H; n=2–6; and, z=0.

15. Coumarin dye-containing polymers as defined in claim 11, where n=2.

16. Coumarin dye-containing polymers as defined in claim 11, where n=5.

17. Coumarin dye-containing polymers as defined in claim 11, where both A and B are the atoms necessary to complete a 6-membered heterocyclic ring.

18. Coumarin dye-containing polymers as defined in claim 7, where D is

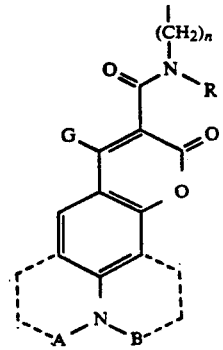

where R is selected from the group consisting of H, and alkyl of 1 to 22 carbon atoms; where G is selected from the group consisting of H, —CH₃, and —CF₃:
where n=2 to 18; and
where both A and B are selected from the group consisting of H, alkyl of 1 to 22 carbon atoms, alkenyl of 1 to 22 carbon atoms, and the atoms necessary to complete a 6-membered heterocyclic ring.

19. Coumarin dye-containing polymers as defined in claim 18 wherein both A and B are the atoms necessary to complete a 6-membered heterocyclic ring.

20. Coumarin dye-containing polymers as defined in claim 19, where n=2–6.

21. Coumarin dye-containing polymers as defined in claim 18 wherein both A and B are ethyl.

22. Coumarin dye-containing polymers as defined in claim 21, where n=2–6.

23. Coumarin dye-containing polymers as defined in claim 21, where n=2.

24. An optically nonlinear polymer film comprising the coumarin dye-containing polymer of claim 1.

25. An optically nonlinear polymer film comprising the coumarin dye-containing polymer of claim 11.

26. An optically nonlinear polymer film comprising the coumarin dye-containing polymer of claim 23.

27. A device comprising a film in accordance with claim 24.

* * * * *